United States Patent [19]

Kalwar et al.

[11] Patent Number: 4,946,568
[45] Date of Patent: Aug. 7, 1990

[54] METHOD OF AN ARRANGEMENT FOR CORONA TREATMENT

[75] Inventors: Klaus Kalwar, Alte Landwehr 10, 4803 Steinhagen; Horst Berger, Bielefeld; Otto Berger, Halle; Fritz Gumpert, Steinhagen, all of Fed. Rep. of Germany

[73] Assignee: Klaus Kalwar, Steinhagen, Fed. Rep. of Germany

[21] Appl. No.: 70,539

[22] Filed: Jul. 6, 1987

[30] Foreign Application Priority Data

Jul. 5, 1986 [DE] Fed. Rep. of Germany ....... 3622737

[51] Int. Cl.$^5$ ............................................. C01B 13/10
[52] U.S. Cl. .................................... 204/164; 204/176; 427/39
[58] Field of Search .................. 427/39; 204/164, 176

[56] References Cited

U.S. PATENT DOCUMENTS

| | | | |
|---|---|---|---|
| 3,970,567 | 7/1976 | Lowther | 204/176 X |
| 4,298,440 | 11/1981 | Hood | 204/168 |
| 4,352,740 | 10/1982 | Grader et al. | 210/760 |
| 4,411,756 | 10/1983 | Bennett et al. | 204/176 |

*Primary Examiner*—Stephen J. Kalafut
*Attorney, Agent, or Firm*—Michael J. Striker

[57] ABSTRACT

A corona treatment of web-shaped materials or shaped bodies is performed by at least one corona electrode which has an operating region, wherein a gas and/or waste heat produced during the corona treatment is aspirated and at least partially returned to the operating region of the corona electrode.

62 Claims, 12 Drawing Sheets

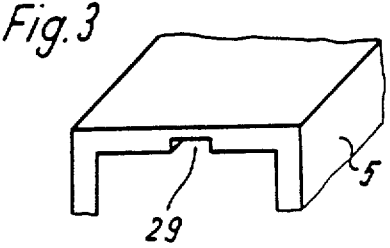
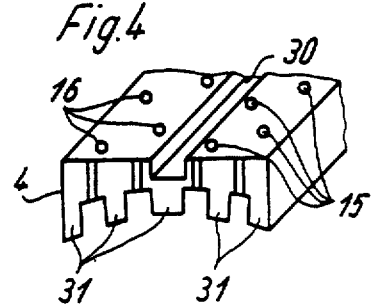
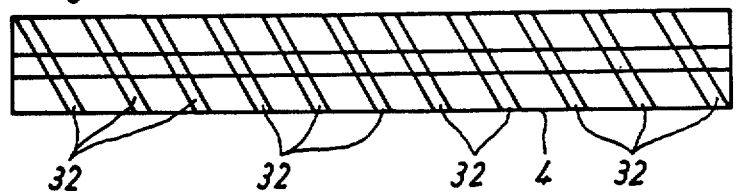
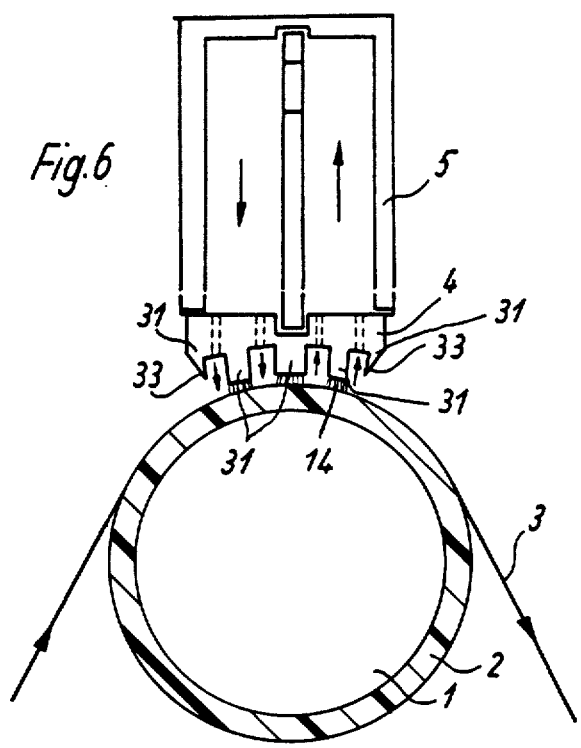

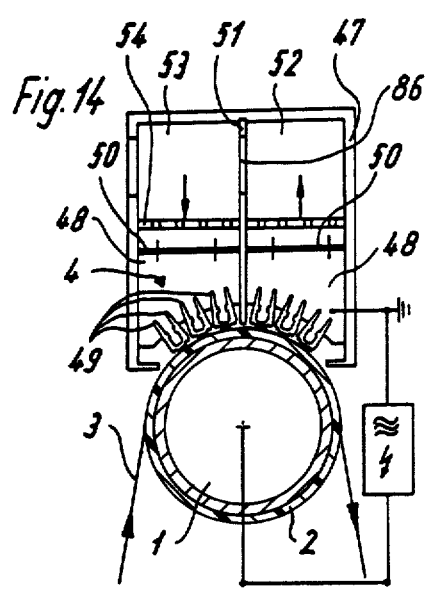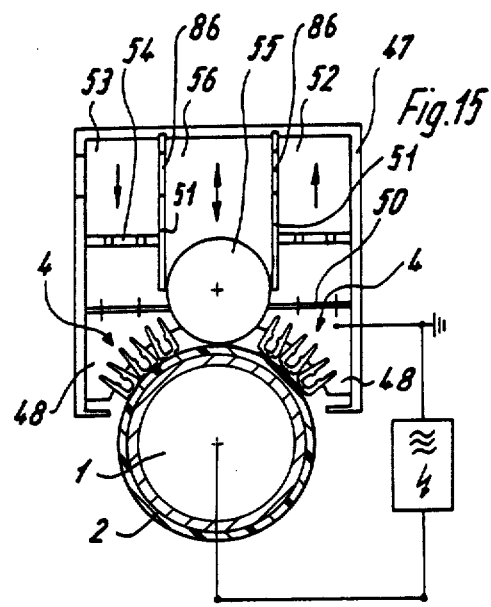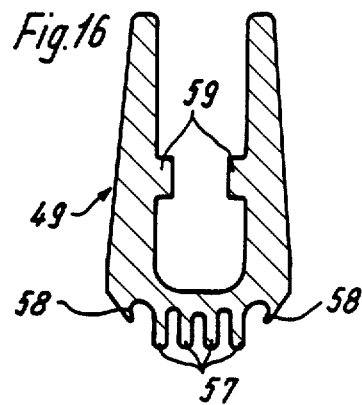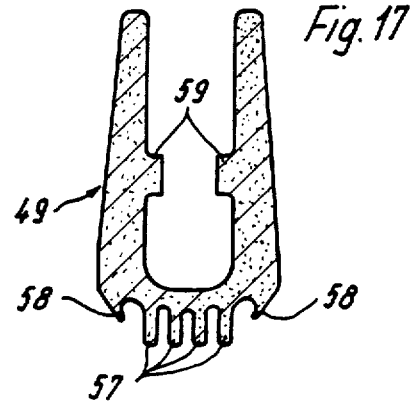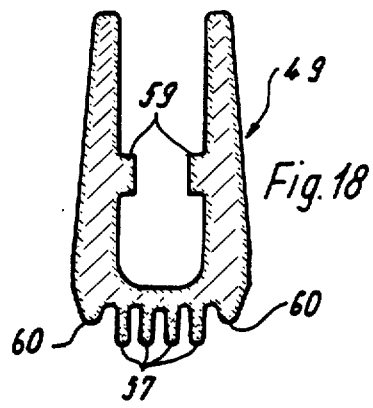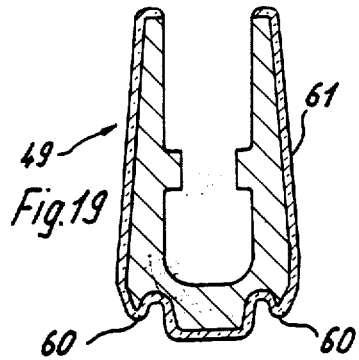

METHOD OF AN ARRANGEMENT FOR CORONA TREATMENT2

BACKGROUND OF THE INVENTION

The present invention relates to a method of and an arrangement for corona treatment of web-shaped materials or shaped bodies with the use of one or several corona electrodes, in which gases produced during the corona treatment in the operating region, such as for example ozone, nitrogen and the like, are aspirated.

It is known that the adhesion on surfaces of a material can be improved by the treatment with an electric corona discharge, or in the event of nonpolar material, the corona discharge provides for a respective adhesive surface. The corona discharge is formed through ozone which is produced during the discharge on the oxidative adhesive centers of the treated material surface. The intensity and number of the adhesive centers is correlated with utilized energy level and discharge frequency. The ozone which is generated during the discharge is extremely aggressive so that the operational personnel of the arrangements for corona treatment must be reliably protected from this ozone. This is carried out by aspiration of the ozone in the region of the corona electrode.

It has been shown that the ozone aspiration results in a reduction of the efficiency of the corona treatment. Especially in the event of big production installations with respective power output and correspondingly big corona discharge installations, this is a very negative factor. The ozone aspiration which has been performed in known arrangements has a further disadvantage in that the electrically relatively conductive ozone as undesirable ionization medium for the corona ignition is only partially available. The same is true with respect to relative electrically conductive nitrogen which is also produced during a corona treatment and becomes no longer available after the aspiration as waste product of the production process.

It is also known that the corona discharge is favorably influenced when the operating region of the high voltage corona electrode is supplied with noble gases such as argon, neon, helium and the like. Since these noble gases or noble gas-containing gas mixtures are very expensive, their use has certain limits with respect to their effective optimization.

An especially unfavorable situation is in the area of the treatment of solvent-containing substrates. In this area, considerable apparatus - and control expenses must be provided because of an explosion danger, for preventing aspiration of igniting solvent/air mixture through the ozone aspiration on the corona electrode, on the one hand, and for preventing health-hazardous ozone on the working place, on the other hand.

SUMMARY OF THE INVENTION

Accordingly, it is an object of the present invention to provide a method of and arrangement for corona treatment of web-shaped materials or shaped bodies, which avoids the disadvantages of the prior art.

More particularly, rt is an object of the present invention to provide a method of and an arrangement for corona treatment, which insure a considerably higher efficiency.

In keeping with these objects and with others which will become apparent hereinafter, one feature of the present invention resides, briefly stated, in a method of and an arrangement for a corona treatment in which a gas or a heat produced during the corona treatment is at least partially returned into an operating region of the corona electrode.

When the method is performed and the arrangement is designed in accordance with the present invention, the efficiency of the corona treatment is considerably increased since experiments of the mechanism of action of the corona discharge with respect to the adhesion value have shown in a surprising manner that in addition to the electrostatic forces which are effective for the adhesion, the oxidation and therefore the quantity of ozone has a significant importance. Also, the return of the remaining electrically conductive gases produced during the corona treatment influences the efficiency of the process in extremely favorable degree.

The known effect of an adhesion value improvement during corona discharge by introduction of heated materials can be achieved in accordance with the invention with low apparatus expenses and without additional energy costs.

A further improvement of the efficiency of the process is achieved in that the energy consumption is reduced as a whole, since the utilized energy for electrical corona discharge is returned in an "energy recycling" and thereby is lower, and the ignition voltage at the high voltage corona electrode can be retained low because of the fact that the ionization conditions in the so-called electrode gap are improved by the returned gas.

The inventive method also provides for a considerably simplified and reliable treatment installation for utilization in explosion-dangerous treatment process.

The sum of the inventive features provides for a considerably lower energy supply for obtaining the corona treatment effect. In addition to the resulting increased efficiency, the utilization of the corona treatment is considerably simplified and improved with respect to its quality, since because of the reduced energy supply which is identical to the reduction of the required high voltage, the undesirable rear side treatment effects are eliminated or prevented.

The rear side treatment effects which involve undesirable corona treatment of the rear side of the foil web have posed a problem in known processes and led partially to higher refuse numbers.

An advantageous embodiment of the arrangement for corona treatment includes a supporting roller electrode over which a material to be treated is supplied, a high voltage corona electrode which is fixed on a housing connected with a supporting pipe and which also has aspirating openings for aspirating the gas through housing into the supporting pipe, wherein the high voltage corona electrode is provided with additional openings through which the aspirated gas and/or waste heat are returned through a separate chamber of the housing to the operating region of the corona electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a portion of a housing in which a corona electrode is fixed of the inventive arrangement;

FIG. 4 is a view showing a portion of a high voltage corona electrode;

FIG. 5 is a view from below of a high voltage corona electrode in accordance with a further embodiment of the invention;

FIG. 6 shows still a further embodiment of a high voltage corona electrode of the present invention;

FIGS. 14 and 15 are respective schematic views of the operating region of the high voltage corona electrode of the inventive arrangement;

FIGS. 16–19 are views showing different high voltage corona electrodes in a cross-section;

DESCRIPTION OF THE PREFERRED EMBODIMENTS

Figure 1:
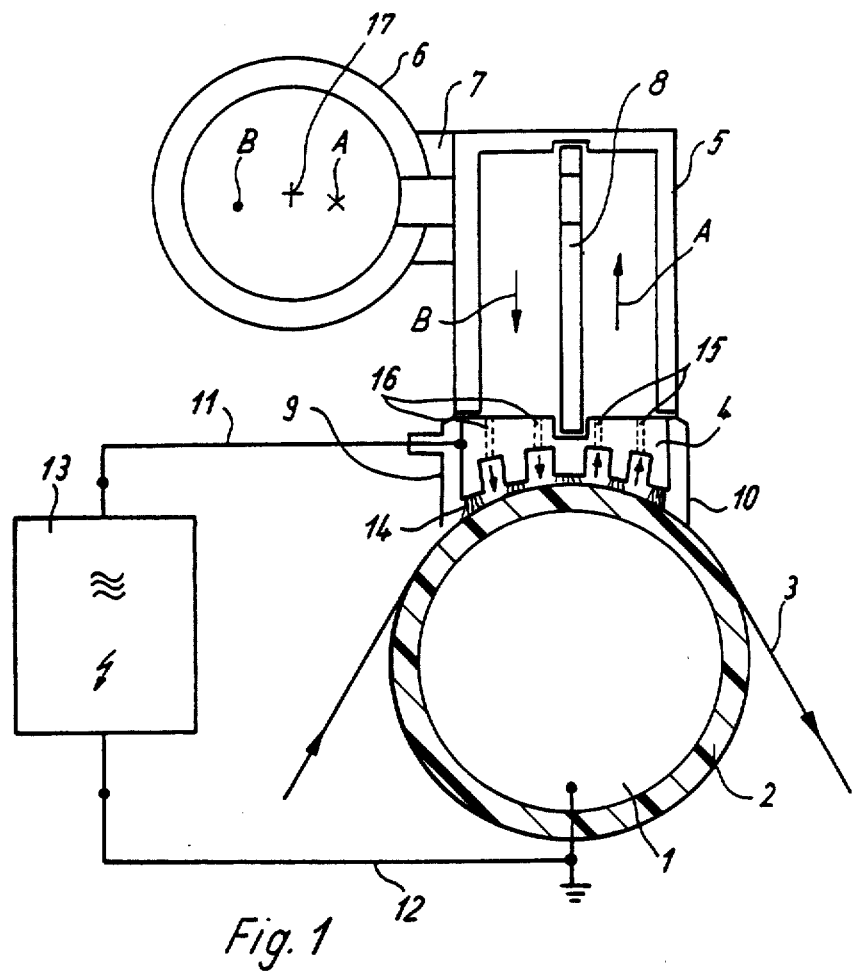
FIG. 1 is a view schematically showing an arrangement for corona treatment of web-shaped materials in accordance with the present invention.

An arrangement for corona treatment of web-shaped materials shown in FIG. 1 has a supporting electrode 1 which is formed as a roller coated with a dielectric 2. The web-shaped material 3 is guided over the supporting electrode 1. A shaped electrode 4 is arranged opposite to the supporting electrode 1 in a housing 5. The housing 5, in turn, is mounted on a supporting pipe 6 via a connecting flange 7.

The housing 5 is subdivided by an inserted partition 8 into two chambers. It is to be understood that the housing 5 can also be provided with several partitions 8, so that the interior of the housing 5 will be subdivided into several chambers. Protective isolating elements 9 and 10 are arranged on the housing 5 and more particularly at its end which faces toward the supporting electrode 1 and carries the shaped electrode 4. The protective isolating elements 9 and 10 laterally overlap the shaped electrode 4. The shaped electrode 4 is connected with a high voltage generator 13 via a conductor 11 which extends through the protective isolating element 9, and the supporting electrode 1 is connected with the high voltage generator 13 via a further conductor 12.

When the high voltage generator 13 is turned into operation, an electrical corona discharge 14 is produced by the high voltage at the shaped electrode 4 relative to the material 3 and thereby the formation of adhesive centers on the outer surface of the material 3 is achieved The shaped electrode 4 has openings 15 through which gases, such as ozone gas, nitrogen gas, etc. produced during the corona discharge can be aspirated through one of the chambers inside the housing 5 into the supporting pipe 6. A portion of the aspirated gas can again be returned to the working region of the shaped electrode 4 through the second chamber of the housing 5 and through further openings 16, for supporting the corona treatment.

The arrow A identifies the direction of aspiration of the produced gases. The arrow B symbolizes the direction of return of the gases into the working region of the shaped electrode 4. The unit which advantageously is composed of three structural elements, namely the shaped electrode 4, the housing 5 and the supporting pipe 6 is turnable about a longitudinal axis 17 of the supporting pipe 6.

Figure 2:
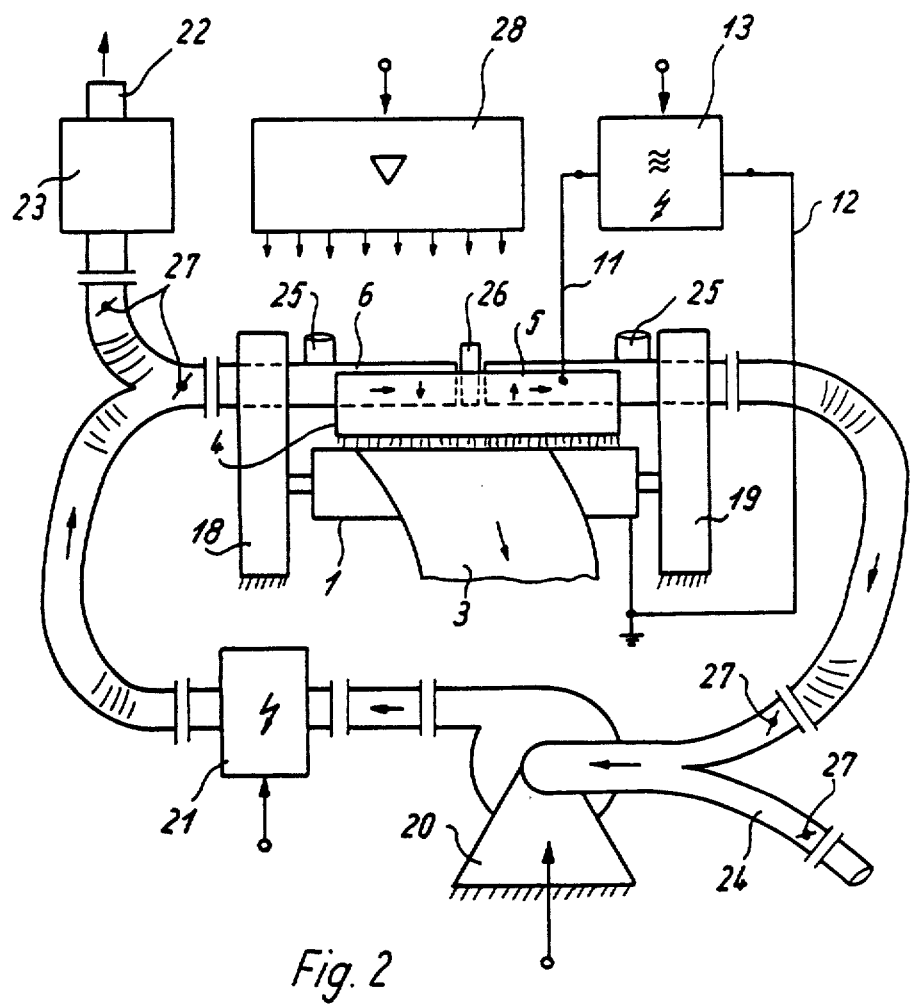
FIG. 2 is a view showing a further embodiment of the inventive arrangement for corona treatment of web-shaped materials.

FIG. 2 shows a complete arrangement for the corona treatment of a web-shaped material 3 in its running direction. The turnable supporting part 6 with the housing 5 and the shaped electrode 4, as well as the supporting electrode 1 are supported in stationary side elements 18 and 19. Gases produced in the operating region of the shaped electrode 4 can be aspirated by means of a fan 20. The fan 20 conveys this gas through a filter 21 which is preferably formed as an electrostatic filter. The cleaned gas after passage through the filter 21 can again be returned into the supporting pipe 6 or withdrawn via an outlet pipe 22. Before its discharge the gas, for example, aggressive trivalent ozone, is converted to normal two valent oxygen in a catalyzer 23.

As can be seen from FIG. 2, an additional aspirating pipe 24 which opens before the suction side of the fan 20 can supply the whole arrangement with fresh air, oxygen, noble gas or a mixture of gases. A connecting pipe 25 opens into supporting pipe 6 and supplies gaseous medium to the shaped electrode 4 independently of the above described ventillation circuit.

A slider 26 arranged substantially in the center of the supporting pipe 6 operates so as to provide selectively either simultaneous supply or withdrawal of a gaseous medium. Various throttling valves 27 are arranged in the ventillation circuit for controlling the gas circulation. A process computer 28 or a respective control can determine all data which are required for the operation and control them for an optimal corona treatment.

FIG. 3 shows the upper part of the housing 5 with a guiding groove 29 for insertion of the partition 8 so as to reliably separate the gas streams inside the housing 5.

FIG. 4 shows the shaped electrode 4. It is clear from this drawing that the shaped electrode 4 is provided with a groove 30 for insertion of the partition 8. The shaped electrode 4 has a curvature which corresponds to the roller-shaped supporting electrode 1. The shaped electrode 4 in the longitudinal direction is provided with several webs 31. The aspirating openings 15 described hereinabove are arranged in the spaces between the webs. The same is true with respect to the openings 16 for returning a gas.

It is advantageous when both the aspirating openings 15 and the further openings 16 are offset relative to one another as considered in the longitudinal direction of the shaped electrode 4. This arrangement of the openings prevents a strip-like distribution of the adhesion value on the material 3 to be treated. The discharge webs 31 can also be provided with opening for passage of air and/or gas stream.

FIG. 5 shows an embodiment of the shaped electrode 4 in which aspiration and return of ozone gas or other gaseous medium is performed without aspiration openings and return openings. Instead, a plurality of cutouts 32 extend diagonally to the longitudinal axis of the shaped electrode 4.

FIG. 6 shows a special embodiment of the shaped electrode 4. The outer webs 31 are formed shorter than the remaining webs and provided with edges 33 which extend toward the center axis of the supporting electrode 1. In this construction on the following and preceding web 31, the corona 14 is carried out in a sharp-edged manner to the supporting electrode 1 by electrical field suppression with the help of the tipped edges 33.

For the whole process it is advantageous when the aspiration of the gas is performed in the region of the material exit, while the return of the ozone gas or another gaseous medium is performed in the region of the material entrance. In this case, in the region of the material exit an aspirating action is obtained while in the region of the material entrance a pumping action is obtained.

Figure 7:
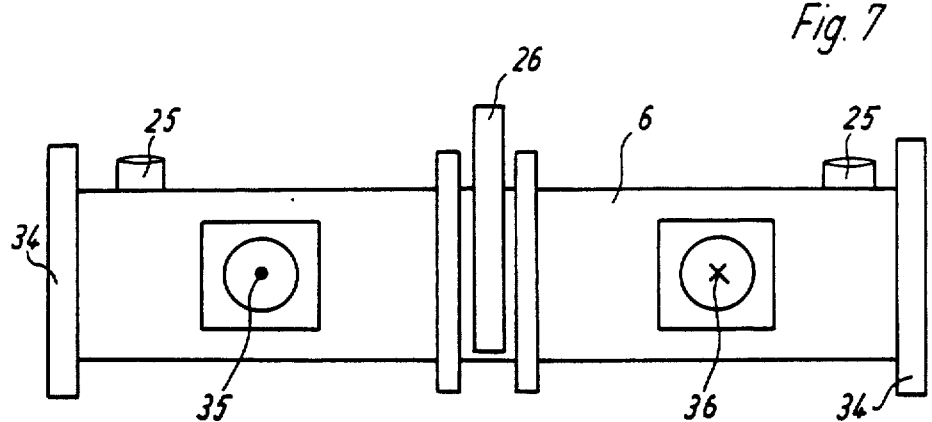
FIG. 7 is a plan view of a supporting pipe of the inventive arrangement of FIGS. 1 and 2.

FIG. 7 shows the supporting pipe 6 of the above described arrangement. The supporting pipe 6 is provided at its end sides with flanges 34 for connecting two respective ventilation conduits. The above described slider 26 in the center of the supporting pipe 6 provides for a chamber formation also inside the supporting pipe 6 so that for example a gas stream can be aspirated in the region of one chamber and a gas stream can be withdrawn from the other chamber (positions 35 and 36). When the slider 26 is opened, a gaseous medium can be selectively aspirated or withdrawn via the position 35 and 36.

Figure 8:
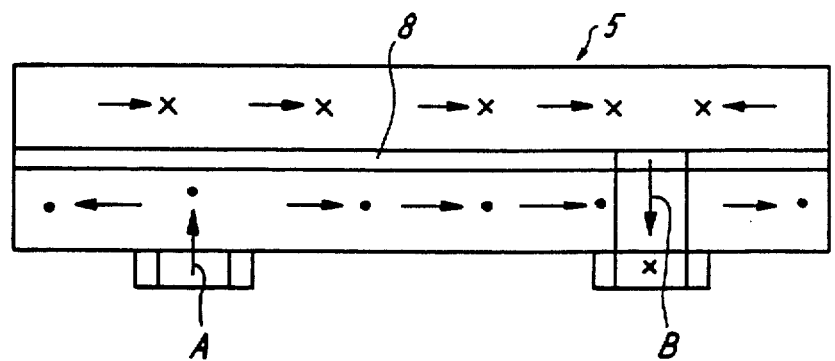
FIG. 8 is a plan view of a housing for receiving a high voltage corona electrode.

FIG. 8 shows a plan view of the housing 5 with partition 8, and arrows A and B which identify the pressure direction and suction direction.

Figure 9:
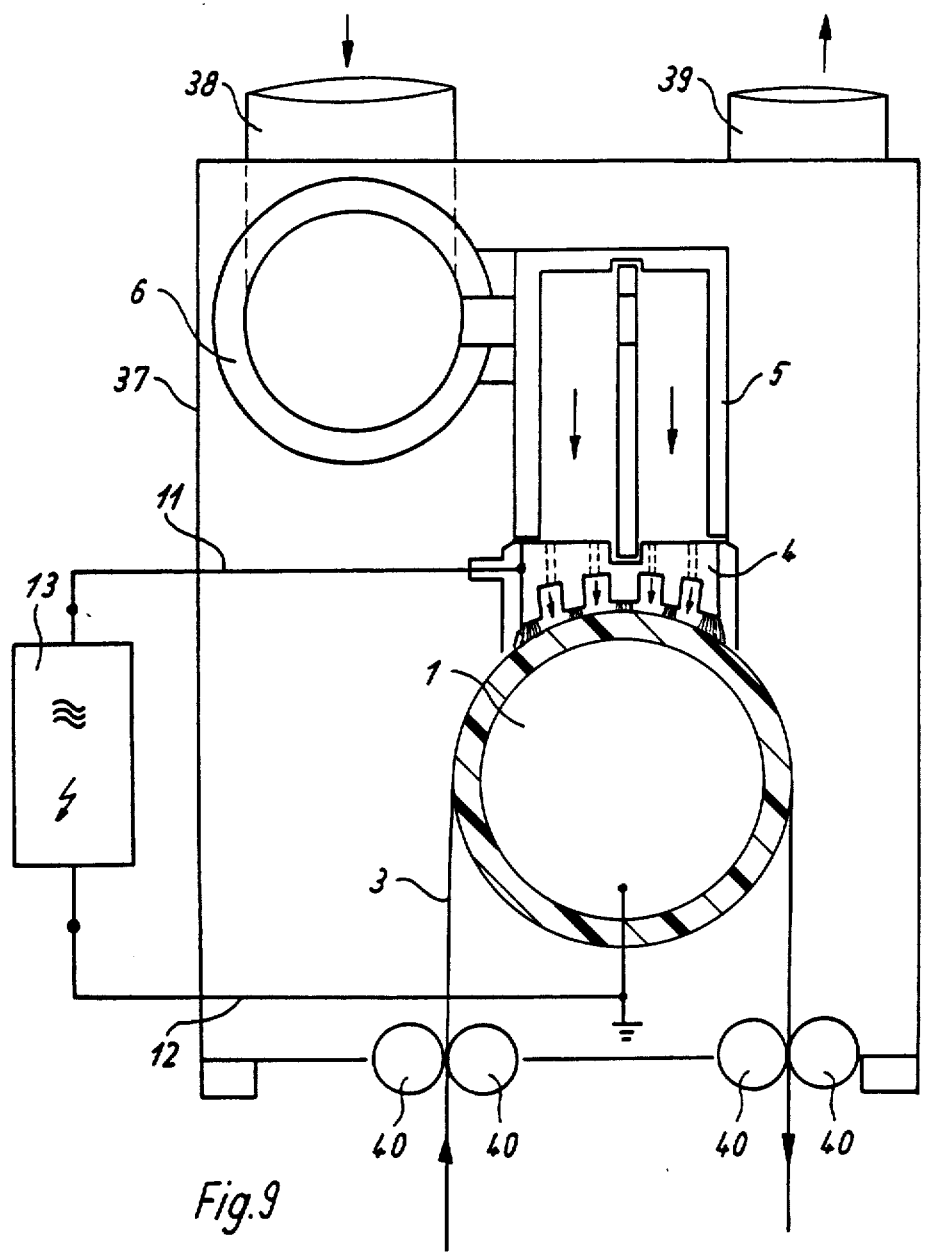
FIG. 9 is a view schematically showing an arrangement for corona treatment to be used in explosion-dangerous treatment process.

FIG. 9 shows an arrangement for corona treatment of web-shaped materials 3 during a production process in which explosion danger can take place. Here also the corona electrode system includes the supporting pipe 6, the housing 5, the shaped electrode 4 and the supporting electrode 1. These structural elements are completely arranged in an additional housing 37. Pressure air for example in condition of open slider, is supplied to the shaped electrode via a pressure air conduit 38 which opens into the additional housing 37, the supporting pipe 6 and the housing 5. The explosive gas mixture cannot reach the shaped electrode 4 because of this pressure air supply.

Gases produced in the region of the corona discharge are aspirated from the inner chamber of the additional housing 37 via an aspirating conduit 39. Simultaneously with the pressure air, the gases can also be supplied through the shaped electrode 4. Rollers 40 provided in the region of the material entrance and the material exit serve for sealing the inner chamber of the additional housing 37.

Figure 10:
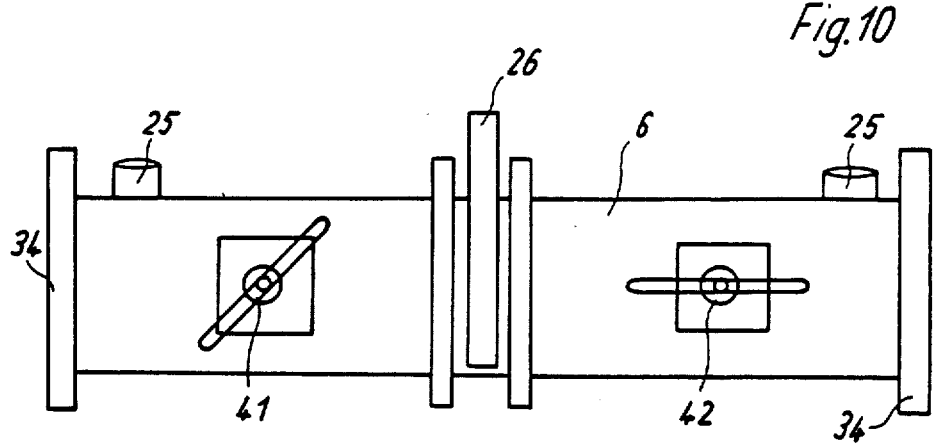
FIG. 10 is a plan view of a supporting pipe in accordance with a further embodiment of the invention.
Figure 11:
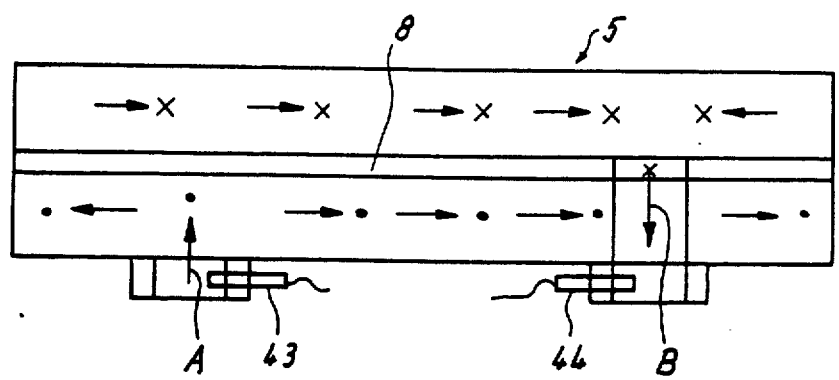
FIG. 11 is a plan view substantially corresponding to the view of FIG. 8 but showing a housing in accordance with a further embodiment of the invention.

As shown in FIG. 10, throttling flaps 41 and 42 can also be arranged inside the supporting pipe 6. The gas stream in the electrode system can be regulated in this case by respective adjustment of these throttling flaps 41 and 42 which can be controlled by the process computer 28.

Measuring value receivers (pickups) 43 and 44 for controlling the operational conditions via the process computer 28 of the electrode system are provided in the connecting flanges 7 of the housing 5. The measuring value receivers 43 and 44 can also be formed as pressure, stream or temperature measuring elements. In connection with this it is especially advantageous to use a gas analyzer, in which case the measuring value receivers are simple suction hoses.

Figure 12:
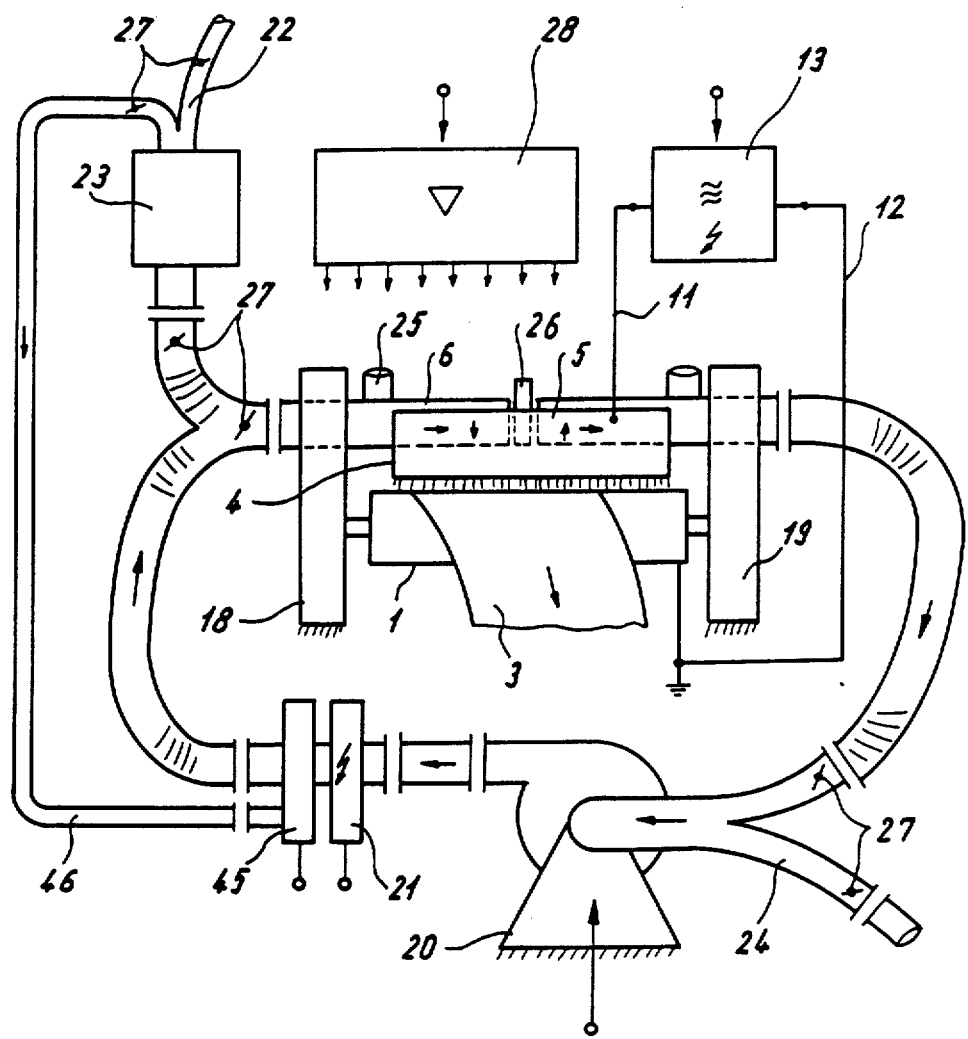
FIG. 12 is a schematic view showing a further embodiment of the inventive arrangement for corona treatment.

The inventive arrangement in accordance with a further embodiment is shown in FIG. 12. Here, in addition to the outlet pipe 22 connected to the catalyzer 23, a conduit 46 is arranged. This conduit is used for returning into the circulation the waste heat produced during the corona discharge and aspirated, together with the oxygen converted in the catalyzer 23. A throttling flap 27 can regulate this supply. For further increasing the efficiency, a heating element 45 is provided. The oxygen which has been preliminarily heated by the waste heat is additionally heated by the heating element 45 to an optimal temperature and dried. Also, the air conveyed by the ventilator can be warmed up or dried.

Figure 13:
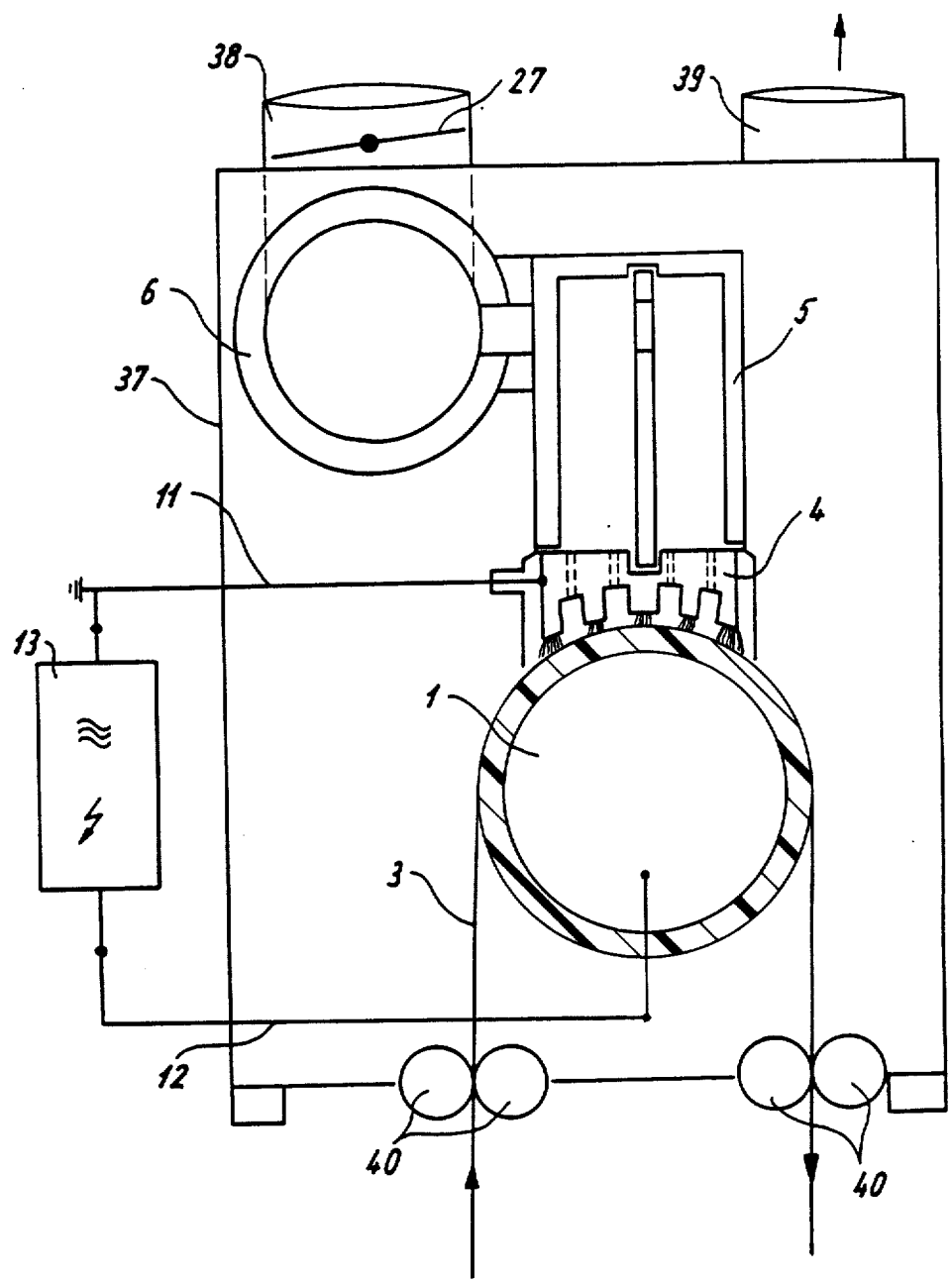
FIG. 13 is a view showing a cross-section of a partial region of the inventive arrangement.

The arrangement of FIG. 13 substantially corresponds to the arrangement of FIG. 9, however, here the pressure air conduit 38 which can serve without loading with pressure air as a supply conduit, is provided with a throttling flap 27 which controls the air supply into the operating region of the shaped electrode 4. In cooperation with the aspirating conduit 39, a negative pressure is produced in the operating region of the shaped electrode 4 and favorably influences the corona discharge. What is important in this embodiment is that the shaped electrode 4 or the corona high voltage electrode is formed as a mass electrode, and the supporting electrode 1 is designed as a voltage conducting electrode.

In the arrangement shown in FIG. 14 the voltage conducting supporting electrode 1 is composed of a carbon fiber material while the dielectric 2 is composed of a glass fiber material. The shaped electrode 4 extends in the direction of longitudinal axis of the supporting electrode and is arranged in a housing 47 which partially engages the supporting electrode 1. The shaped electrode 4 is subdivided in its longitudinal direction into two equal parts, and each part is composed of individual segments in form of electrode strips 49. The electrode strips 49 are supported on pipes 48 which are connected with a flange 50 of the housing 47. It is possible to move the shaped electrode 4 deeper when required, so as to insure a simple and rational mounting and dismounting of the shaped electrode 4.

In correspondence with the widths of the material to be treated, the shaped electrode 4 can be bearingly supported. The housing is separated by a partition 51 into two chambers 52 and 53. Two pipes 48 are provided each removably connected with a respective one of the chambers 52 and 53. The air withdrawal of the shaped electrode is performed via the chamber 52, while the air supply is performed via the chamber 53. The air supply stream of the supplied or withdrawn medium can be uniformly distributed by means of a conductive plate provided with perforations and each arranged in the chambers 52 and 53. The thus uniformly distributed stream can be supplied to the shaped electrode 4. The partitions 51 are provided with their throughgoing perforations 86

FIG. 15 shows a further improvement of the arrangement of FIG. 14. A sealing roller 55 is arranged between the pipes 48 which receive the electrode strips 49. It separates and seals the air supply region from the air withdrawal region. The air supply and withdrawal of this sealing roller is possible through a further chamber 56.

FIGS. 16–19 show differently formed electrode strips 49. The electrode strips in accordance with FIGS. 16 and 17 are provided with discharge webs 57 at their lower side facing toward the material. Auxiliary electrodes 58 are arranged at the outer sides near the outer discharge webs 57 and extend parallel to them. The auxiliary electrodes 58 provide an exact limitation of the high voltage unloading by electrostatic field suppression on the loading webs 57, so that a more accurate transition from the treated to untreated material can be produced. The legs of the electrode strip 49 which has a substantially U-shaped cross-section thicken in direction to the discharge web 57 which practically form the connecting web between both legs of the electrode strip 49. This thickening provides for an increase of the stability of the electrode strip 49, so that a mechanical damage, for example by striking of elevated material guided over the supporting electrode 1 does not affect the operation of each electrode strip 49.

Supporting strips 59 are arranged on the inner side of the legs of the electrode strips 49 and face toward one another. The electrode 49 is fixed in the pipes 48 by means of the supporting strips 59 and corresponding arresting means provided on the respective pipes 48. Basically, each electrode strip is composed of a conductive material. The electrode strips 49 shown in FIG. 16 are composed of a conductive metal, while the electrode strips 49 shown in FIG. 17 are composed of a conductive carbon fiber material.

The electrode strip 49 shown in FIG. 18 is composed of an electrically conductive carbon and coated with a nonconductive and non-oxidizing ceramic layer. The ceramic layer can be composed of silicium nitride, aluminum nitride, or a boron nitride and applied on the electrode strip bodies by so-called PVD processes (Physical Vapor Disposition) or CVD processes (Chemical Vapor Disposition). Similarly to the electrode strips 49 shown in FIGS. 16 and 17, the auxiliary electrodes 60 are provided in the same positions. However, they are not sharp-edged, but instead spherical so that the ceramic coating can be applied simpler on the outer surface of the electrode strip bodies and also is firmly retainable in this region.

The electrode strip body of the electrode strip 49 shown in FIG. 19 is composed of a conductive metal. At least the outer surface of the electrode strip body is provided with a ceramic layer 61 which is formed, for example, of aluminum oxide or aluminum nitride applied by a plasma process or a flame injection process. The auxiliary electrodes 60 are also formed spherical for the reasons explained hereinabove. The electrode strip 49 at its side which faces toward the material web 3, in contrast to the electrode strips shown in FIGS. 16–18, is not provided with the discharge webs 57 but instead is formed smooth. For insuring an optimal application and adherence of the ceramic layer to the electrode strip body, all transitional regions are rounded.

Figure 20:
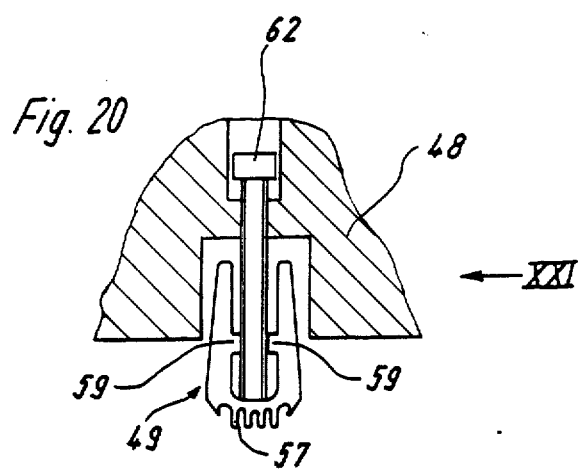
FIG. 20 is a view showing a partial cross-section of the inventive arrangement in the region of a high voltage corona electrode.

FIG. 20 shows an example of fixation of one electrode strip 49 to the pipe 48. An adjusting screw 62 which is fixed in the electrode strip 49 on the one hand and supported on the pipe 48 on the other hand, can be used for adjusting the electrode strip 49 as to its height and distance relative to the material 3. Thereby different requirements with respect to a distance change for the purpose of providing a different corona treatment can be satisfied in a fast and simple manner.

Figure 21:
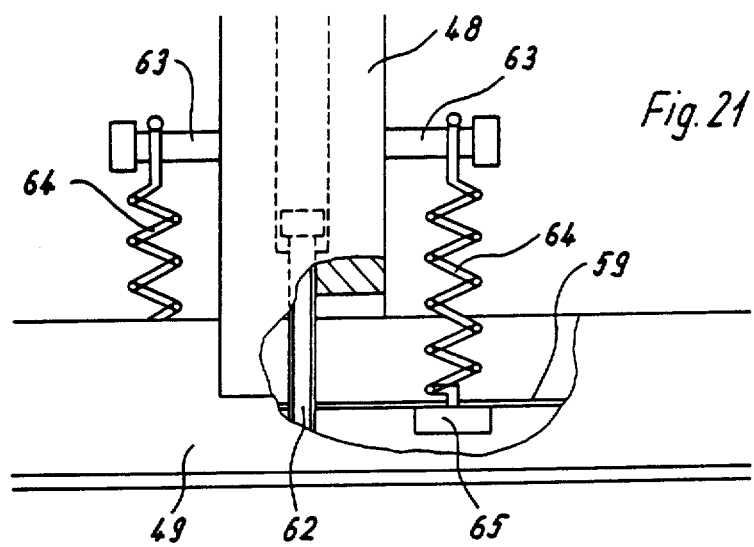
FIG. 21 is a partial front view of the operating region of the high voltage corona electrode of the invention.

FIG. 21 shows the support 48 and one electrode strip 49 as seen in direction of the arrow XXI in FIG. 20. Holding screws 63 are fixed parallel to the electrode strip 49 in the pipe 48 and a pulling spring 64 is suspended on the shaft of the holding screw. A holding part 65 is provided on the opposite end of the pulling spring 64 and engages the supporting strip 59 of the electrode strip 49. In this construction the electrode 49 is held by the pulling tension of the pulling spring 64, it provides for an especially simple adjustment of the electrode strip 49.

Figure 22:
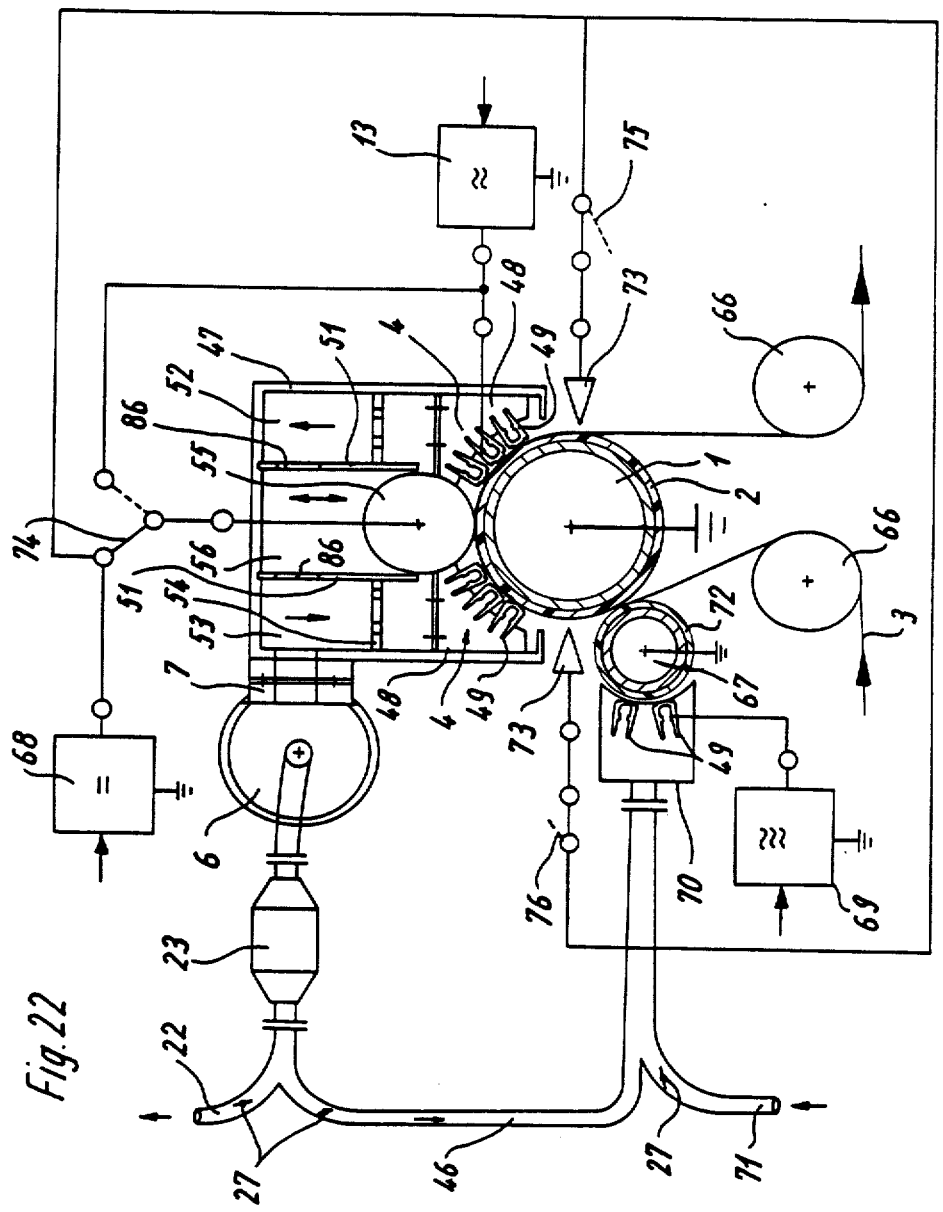
FIG. 22 is a view showing a further embodiment of the inventive arrangement for corona treatment.

The arrangement in accordance with the embodiment which includes all features for increasing the efficiency is shown in FIG. 22. A material web 3 is supplied by conducting rollers 66 in a known manner to the arrangement for corona discharge. The material web 3 lies with its rear side on the supporting electrode 1 which is provided with a dielectric 2. The material web 3 is guided under two shaped electrodes 4 each composed of electrode strips 49 which are fixed in the support 48. Corona discharge is performed by means of these electrode strips, and the material web 3 is treated on its surface which faces toward the shaped electrodes 4. The shaped electrodes 4, the supports 48 and the sealing roller 55 are arranged in the housing which corresponds to the housing of FIG. 15. The housing 47 is connected by the connecting flange 7 with the supporting pipe 6.

During the operation of the arrangement and performance of the process, the generator 13 for producing high frequency high voltage is turned on, so that a corona discharge is produced on the shaped electrodes 4. The produced waste heat and the gaseous air split products, such as ozone and nitrogen or the like are aspirated through the chamber 52 and partially supplied via the chamber 53 to the shaped electrodes 4 in the above described manner. The portion of the gas aspirated through the chamber 52, particularly a portion of the waste heat is supplied via the supporting pipe 6 to the catalyzer 23 which converts the three valent ozone to two valent oxygen. The produced and heated oxygen atmosphere is conveyed via the conduit 46 to a housing 70 which partially covers a pressing roller 67.

Since heated material web 3 increases the efficiency of the corona treatment, the material web in this embodiment is warmed by the pressing roller 67 which takes over the function of a heat accumulator. The pressing roller abuts against that side of the material web 3 which is to be subjected to a corona treatment, so that this side is acted upon by the heat.

In addition to the utilization of waste heat, a separate heating of air and its supply through a further conduit 71 to the housing 70 is desirable, for example, in the form which is shown in FIG. 12 and explained in the description accompanying the same. For example, the waste heat of generators which operate in the process can be used for this additional heating. Especially when high product speeds are required for corona treatment of the material web 3 or when it is necessary to treat materials 3 which are difficult to be treated, the pressing roller 67 is provided with an external heating.

An advantageous type of the external heat recovery is shown also in FIG. 22. The pressing roller 67 is provided with a dielectric 72, while electrode strips 49 are arranged in the housing 70 and connected to a generator 69. Without the formation of a corona discharge, the electrode strips 49 and the dielectric 72 in their cooperation generate heat by dielectric power loss. This heat directly heats that surface of the material web 3 which is to be subjected to a corona discharge, and indirectly heats the supply air.

Further heat sources which can be used are infrared heating and the like. Experiments have shown that for the targeted charging of the material to be treated, the formation of adhesion centers is favorable, and this charging is advantageous both before and after the corona discharge points. A high voltage direct current source 68 and needle-shaped electrode 73 which are arranged before and after the operating region of the shaped electrode can provide a direct current in entrance and exit of the material web 3 on the material for forming electrostatic forces.

A further possibility is to connect the direct current source 68 via a switch 74 to the sealing roller 55 for charging of the material web 3. By means of the switches 75 and 76, the direct current can be connected with the electrodes 73.

The pipes 48 together with the electrode strips 49 are associated as a unit with the housing 47 and can be completely exchanged as one piece when required. The whole system, namely the electrode strips 49, the pipes 48 and the housing 47 is removably fixed by means of the connecying flange 7 to the supporting pipe 6 so that the system as a whole can be removed and exchanged when needed.

The supporting electrode 1 and selectively the pressing roller 67 is produced in an advantageous manner from a carbon fiber material, while the dielectric is composed of a a coating from glass fiber, an ozone-resistant vulcanized elastomer, for example, silicon rubber, or a ceramic material.

In accordance with the invention, an efficiency optimization is determined and controlled with the aid of a process computer and a process control. The parameters which are to be considered by the process computer include the material parameter which depends upon the type of material, the dimension of the material and the used filler, the production parameter which depends upon the process of production, the type of machinery and the operating speed, the climate parameter which depends upon the climate of environment of the electrodes (air temperature, air moisture, air pressure), the corona parameter which depends upon the power, the voltage, the frequency and the electrode capacity.

The corona energy consumption per surface of the material rust be determined, because of lack of suitable measuring means for process-synchronous measurement, in a laboratory and given as a nominal value. The nominal value determination is performed advantageously after the determination of surface tension by means of a boundary angle measurement and the wetting test with surface tensiondefinite test solutions. The values obtained by these experiments are reciprocal relative to one another and make possible relatively good judgment of the corona energy consumption level of the tested material. The actual value is produced from the energy consumption of the generator which is required by the treatment material. The difference from the nominal value and the actual value is utilized for regulation or control of the generator intensity and the electrode capacity and thereby for increase of the efficiency of the electrode system and for quality stabilization of the adhesion value.

Figure 23:
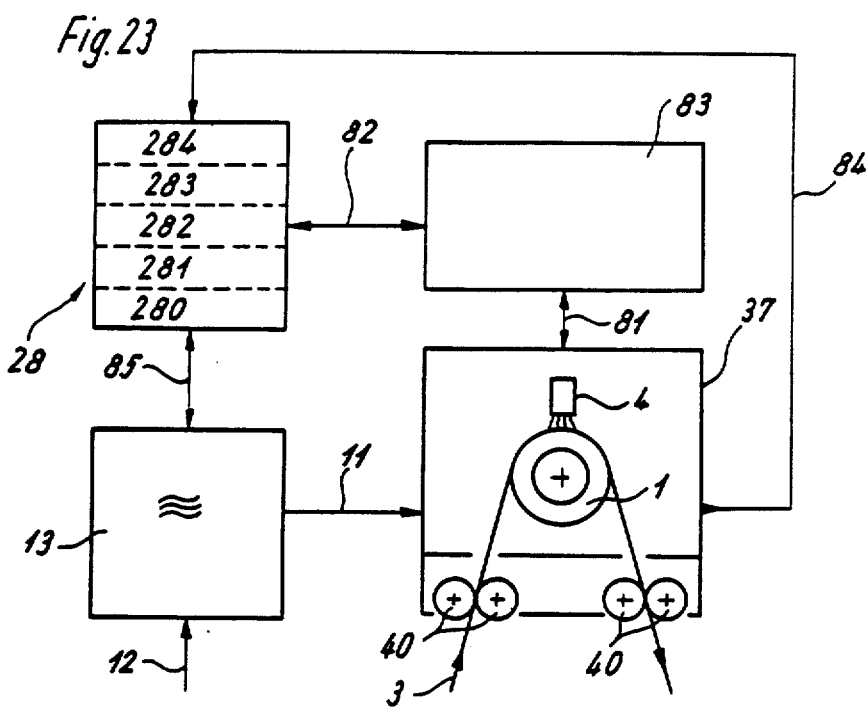
FIG. 23 is a schematic view of the inventive arrangement with a differentiating process computer.

The arrangement and operation of the process computer 28 is shown in FIG. 23. As described hereinabove, a material web 3 is subjected to a corona discharge by the high voltage generator 13, a shaped electrode 4, and a supporting electrode 1. For controlling the climate inside the operating region of the corona electrodes, the operating region is completely enclosed by the housing 37, and the material entrance and exit is sealed by the rollers 40. A subsequently arranged measuring device 83 transmits the values measured inside the housing 37 through a conductor 81, and the climate conditions from the operating region of the corona electrodes, such as temperature, moisture and pressure are reported in optimal manner for the adhesion value.

The process computer 28 is connected with the generator 13 via a further conductor 85, and the process computer is provided with measuring, controlling, regulating and data processing devices. Further measuring data are supplied via the conductor 84 to the process computer 28. A comparison between the nominal and actual values of different physical magnitudes takes place in the process computer 28 and the results in form of a difference are supplied as an adjusting signal via the conductor 82 to the adjusting drive of the arrangement and via the conductor 85 to the generator 13.

The corona parameters in the generator 13 and in the housing 37 are considered in the device part 80 of the process computer 28 with measuring and regulating technique. The physical values are electrode current, voltage and frequency.

As mentioned hereinabove, it is not possible to measure the adhesion value absolutely continuously, but instead it is possible only with relative process synchronization. The results of this relative measurement are determined by means of microelectronics in respective data and utilized for a reproducible production process.

A further advantageous measuring value is the electric outlet power of the generator 13. The nominal value given from practice is determined in accordance with the type of material. The supplied energy value is considered with the material surface, the electrode width and number as static value and the production speed is considered by means of tacho measurement as dynamic value. With the utilization of this partial regulating device, it is insured that no adhesion value worsening, for example by changed production speed and different energy supplies per material surface connected therewith, can take place.

The climate parameters in the housing 37 are considered in the device part 281 with measuring and regulating technique. The upper and lower pressure, the temperature and the moisture are regulated.

The production parameter of the respective treatment process is considered in a device part 282. Characteristic values of the process and the production speed have influence on the energy output on the electrodes 1, 4.

The material parameter is considered in a device part 283. Also from practical values influenced by the type of material and dimensional material as well as fillers in the material, the energy level on the electrodes 1, 4 is determined.

A product data consideration and its storage is performed in a device part 284. An optimal production can be determined from reproducibility of these data. As mentioned above, it is not possible to measure the adhesion value absolutely continuously.

For absolute measurements the production process must be interrupted with high expenses and after the conducted measurements it must be decided whether the desired results have been reached. When this is the case, all physical values are determined in the data determination part and held ready in coded form for further utilization in next and similar production case.

It will be understood that each of the elements described above, or two or more together, may also find a useful application in other types of constructions differing from the types described above.

While the invention has been illustrated and described as embodied in a method of and arrangement for corona treatment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of corona treatment of web-shaped materials or shaped bodies, comprising the steps of providing a web-shaped material; arranging at least one corona electrode having an operating region for a corona discharge to treat the web-shaped material so as to improve its adhesion which corona discharge produces a gas and a heat; and increasing an efficiency of the treatment by returning into the operating region of the corona electrode at least one of said gas and said heat at least in a partial quantity.

2. A method as defined in claim 1; and further comprising supplying an additional gaseous medium into the operating region of the corona electrode; aspirating the gaseous medium together with the gas produced during the corona discharge; and supplying the aspirated gaseous medium together with the gas produced during the corona discharge into the operating region of the corona electrode.

3. A method as defined in claim 1, wherein said gaseous medium is a noble gas.

4. A method as defined in claim 2, wherein said gaseous medium is a gas mixture.

5. A method as defined in claim 2, wherein the electrode is formed as a shaped electrode and bounds an electrode gap, said supplying step including supplying the gaseous medium directly into the electrode gap over the shaped electrode.

6. A method of corona treatment of web-shaped materials or shaped bodies comprising the steps of providing a web-shaped material; arranging at least one corona discharge to treat the web-shaped material so as to improve its adhesion, which corona discharge produces a gas and a heat; returning into the operating region of the corona electrode at least one of said agas and heat in a partial quantity; and purifying the gas before the returning of the gas into the operating region of the corona electrode.

7. A method as defined in claim 6, wherein said purifying includes purifying the gas in an electrostatic filter.

8. A method as defined in claim 1; and further comprising controlling the returning of the gas into the operating region of the corona electrode.

9. A method as defined in claim 8, wherein said controlling includes using a process computer for controlling the returning of gas into the operating region of the corona electrode.

10. A method as defined in claim 8, wherein said controlling includes using a control with adjusting members for controlling the returning of gas into the operating region of the corona electrode.

11. A method as defined in claim 9; and further comprising determining by measurements data of production parameters formed of a production process, a type of machinery and a processing speed, of climate parameters formed of an environment climate of the corona electrode, air temperature, air moisture and air pressure, and of corona parameters formed of power, voltage, frequency and electrode capacity; processing the data in the process computer by comparing actual and nominal values of the parameters; determining difference data; and using the difference data for the controlling.

12. A method as defined in claim 11, wherein said using of the data includes setting and controlling a corona intensity by a generator and adjusting an electrode capacity.

13. A method of corona treatment of web-shaped materials or shaped bodies, comprising the steps of providing a web-shaped material; arranging at least one corona electrode having an operating region for a corona discharge to treat the web-shaped material so as to improve its adhesion, which corona discharge produces a gas and a heat; returning into the operating region of the corona electrode at least one of said gas and heat at least in a partial quantity; and heating the returned gas by the waste heat of a process-dependent device.

14. A method as defined in claim 13, wherein said heating includes using a generator as the process-dependent device.

15. A method of corona treatment of web-shaped materials or shaped bodies, comprising the steps of providing a web-shaped material; arranging at least one corona electrode having an operating region for a corona discharge to treat the web-shaped material so as to improve its adhesion, which corona discharge produces a gas and a heat; returning into the operating region of the corona electrode at least one of said gas and heat at least in a partial quantity; and drying the waste heat by a supplied air.

16. A method of corona treatment of web-shaped materials or shaped bodies, comprising the steps of providing a web-shaped material; arranging at least one corona electrode having an operating region for a corona discharge to treat the web-shaped material so as to improve its adhesion, which corona discharge produces a gas and a heat; returning into the operating region of the corona electrode at least one of said gas and heat at least in a partial quantity; and producing a negative pressure in the operationg region of the corona electrode.

17. A method of corona treatment of web-shaped materials or shaped bodies, comprising the steps of providing a web-shaped material; arranging at least one corona electrode having an operating region for a corona discharge to treat the web-shaped material so as to improve its adhesion, which corona discharge produces a gas and a heat; returning into the operating region of the corona electrode at least one of said gas and heat at least in a partial quantity; and passing the returned gas through a catalyzer.

18. A method as defined in claim 17, wherein said passing includes passing the gas through a catalyzer in the operating region of the corona electrode.

19. A method as defined in claim 17; and further comprising discharging the returned gas into atmosphere, said passing includes passing the returned gas through the catalyzer before the discharging into the atmosphere.

20. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; and means for further improving an efficiency of the treatment by returning at least one of the gas and heat produced during the corona treatment into the operating region of said corona electrode at least in a partial quantity.

21. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; and an additional electrode, one of said electrodes being formed as a roller electrode over which a material to be treated is guided, the other of said electrodes being formed as a corona electrode, said corona electrode being provided with aspirating openings through which the gas is aspirated, and additional openings through which the aspirated gas or waste heat is returned to the operating region.

22. An arrangement as defined in claim 21; and further comprising a supporting pipe; a housing connected with said supporting pipe and supporting said corona electrode, said housing being subdivided into at least two chambers arranged so that the gas is aspirated from said aspirating openings through one of said chambers into said supporting pipe, and the aspirated gas or waste heat is returned through the other of said chambers to said additional openings to be returned into the operating region.

23. An arrangement as defined in claim 22, wherein said supporting pipe is provided with a slider which is arranged so as to separate the aspirated gas and the returned gas or waste heat.

24. An arrangement as defined in claim 22, wherein said housing is provided with a partition for subdividing into said two chambers, said corona electrode being formed as a shaped electrode, said housing and said shaped electrode being provided with guiding grooves for inserting said partition therein.

25. An arrangement as defined in claim 21, wherein said corona electrode is formed as a shaped electrode and provided with a plurality of webs, said aspirating openings and said additional openings being arranged between said webs and diagonally offset relative to one another.

26. An arrangement as defined in claim 21, wherein said corona electrode is formed as a shaped electrode provided with a plurality of webs, said aspirating openings and said additional openings being provided in said webs and diagonally offset relative to one another.

27. An arrangement as defined in claim 21, wherein said corona electrode is formed as a shaped electrode having a longitudinal axis, said openings being formed as recesses extending diagonally to said longitudinal axis.

28. An arrangement as defined in claim 21, wherein said corona electrode is formed as a shaped electrode provided with a plurality of webs including outer webs having tips.

29. An arrangement as defined in claim 28, wherein said supporting roller electrode has a center, said tips of said outer webs of said shaped electrode extending in a direction toward said center of said supporting roller electrode.

30. An arrangement as defined in claim 21, wherein said corona electrode is formed as a shaped electrode covered with a protective isolation.

31. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; and a sealed additional housing which surrounds said electrode with said aspirating means and said returning means and is provided with a separate aspirating pipe.

32. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; and a plurality of throttling valves arranged for controlling the aspirating and returning of the gas and heat.

33. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity, said corona electrode including a plurality of electrode strips which are arranged near one another and extend parallel to one another.

34. An arrangement as defined in claim 33; and further comprising a housing; and at least one support releasably connected with the housing, said electrode strips being arranged in said support.

35. An arrangement as defined in claim 33, wherein said electrode strips of said corona electrode are composed of a carbon fiber material.

36. An arrangement as defined in claim 33, wherein said electrode strips of said corona electrode each have a core composed of a conductive carbon material, and an outer non-conductive and non-oxidizing ceramic layer.

37. An arrangement as defined in claim 36, wherein said core of said electrode strips of said corona electrode is composed of graphite.

38. An arrangement as defined in claim 36, wherein said ceramic layer of said electrode strips of said corona electrode is composed of a material selected from the group consisting of silicium nitride aluminum nitride, and boron nitride.

39. An arrangement as defined in claim 33, wherein said electrode strips of said corona electrode each have a core of a conductive metal and an outer ceramic coating.

40. An arrangement as defined in claim 39, wherein said outer ceramic coating of each of said electrode strips of said corona electrode is composed of a material selected from the group consisting of aluminum oxide and aluminum nitride.

41. An arrangement as defined in claim 33, wherein each electrode strip of said corona electrode is U-shaped and has two legs and a connecting web directed toward said supporting roller electrode.

42. An arrangement as defined in claim 41, wherein said web of each of said U-shaped electrode strips has outer edges and is provided at said outer edges with auxiliary electrodes.

43. An arrangement as defined in claim 42, wherein said auxiliary electrodes provided at said outer edges of said electrode strip are sharp edged.

44. An arrangement as defined in claim 42, wherein said auxiliary electrodes provided at said outer edges of said web of said electrode strip are spherical.

45. An arrangement as defined in claim 41, wherein each of said legs of each of said electrode strips has a shape which thickens in direction toward said connecting web.

46. An arrangement as defined in claim 41, wherein each of said electrode strips has a longitudinal direction, each of said webs of said electrode strips having an outer side and being provided at said outer side with a plurality of discharging webs which are arranged near one another and extend in the longitudinal direction of said electrode strips parallel to one another.

47. An arrangement as defined in claim 33; and further comprising a support, each of said electrode strips being fixed to said support in a vertically adjustable manner.

48. An arrangement as defined in claim 47; and further comprising adjusting screws arranged to fix each of said electrode strips on said support in a vertically adjustable manner.

49. An arrangement as defined in claim 33, wherein of said electrode strips has a longitudinal direction and is supported turnably in said longitudinal direction.

50. An arrangement as defined in claim 41, wherein each of said legs of each of said electrode strips has an inner side and is provided at said inner side with a supporting strip; and further comprising a support provided with supporting parts each engaging a respective one of said supporting strips; and pulling springs arranged to fix said supporting parts on said support.

51. An arrangement as defined in claim 22; and further comprising a sealing roller arranged between said chambers so as to abut in an operational position against the material web.

52. An arrangement as defined in claim 51, wherein said sealing roller is supplied with direct voltage.

53. An arrangement as defined in claim 22, wherein at least one of said chambers of said housing is provided with a guiding plate having a plurality of openings.

54. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; and a pressing roller formed as an additional supporting electrode and arranged so that it abuts against the material web at its side facing toward said corona electrode, said corona electrode being formed as a shaped electrode provided with a plurality of electrode strips which are arranged at an opposite side of the material web.

55. An arrangement as defined in claim 21, wherein said corona electrode is formed as a shaped electrode; and further comprising a plurality of needle-shaped electrodes supplied with direct voltage and associated with said shaped electrode.

56. An arrangement as defined in claim 55, wherein said needle-shaped electrodes are located at least prior to said shaped electrode.

57. An arrangement as defined in claim 55, wherein said needle-shaped electrodes are arranged at least after said shaped electrode.

58. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; and a gas return conduit; and means for heating the returned gas in the region of said gas return conduit.

59. An arrangement for corona treatment of web-shaped materials or shaped bodies, comprising means for providing a web-shaped material; at least one corona electrode defining an operating region to treat the web-shaped material so as to improve its adhesion; means for aspirating a gas produced during a corona treatment; means for returning at least one of the gas and heat produced during the corona treatment into the operating region of said corona electrode at least in a partial quantity; means for supplying air into the operating region; and means for heating the air in the region of said air supplying means.

60. An arrangement as defined in claim 21, wherein said supporting roller electrode includes a core of a carbon fiber material and a dielectric coating composed of material selected from the group consisting of a glass fiber material, an ozone resistant vulcanizable elastomeric material and a ceramic material.

61. An arrangement as defined in claim 54, wherein said pressing roller has a core composed of a carbon fiber material and a coating composed of a dielectric selected from the group consisting of a glass fiber material, an ozone resistant vulcanizable elastomer and a ceramic material.

62. An arrangement as defined in claim 22; and further comprising a partition subdividing said housing into said chambers and provided with a plurality of perforations.

* * * * *